United States Patent [19]

Manancero

[11] Patent Number: 5,297,965
[45] Date of Patent: Mar. 29, 1994

[54] MATHEMATICAL AND SPATIAL TOY APPARATUS

[76] Inventor: Sergio O. Manancero, 7103 Trenton La. North, Maple Grove, Minn. 55369-5609

[21] Appl. No.: 44,767

[22] Filed: Apr. 12, 1993

[51] Int. Cl.⁵ .................. G09B 1/00; G09B 19/02; G09B 19/00
[52] U.S. Cl. .................. 434/195; 434/205; 434/208
[58] Field of Search ............ 434/193, 195, 196, 205, 434/208

[56] References Cited

U.S. PATENT DOCUMENTS

| | | | |
|---|---|---|---|
| 1,183,570 | 5/1916 | Kneeshaw | 434/195 |
| 1,471,437 | 10/1923 | Wood | 434/195 |
| 2,494,469 | 1/1950 | Booth | 434/196 |
| 2,809,443 | 10/1957 | Hospodar | 434/195 X |
| 3,410,002 | 11/1968 | Mulholland et al. | 434/195 |

FOREIGN PATENT DOCUMENTS

| | | | |
|---|---|---|---|
| 689155 | 9/1930 | France | 434/208 |
| 1296392 | 11/1972 | United Kingdom | 434/195 |

*Primary Examiner*—John G. Weiss
*Assistant Examiner*—Cindy A. Cherichetti
*Attorney, Agent, or Firm*—Leon Gilden

[57] ABSTRACT

A mathematical and spatial toy apparatus is arranged to include a grooved rack board arranged to receive individual block components to teach children the mathematical cumulative effect of such boards to provide rudimentary teaching in mathematical and spatial relationships.

2 Claims, 4 Drawing Sheets

MATHEMATICAL AND SPATIAL TOY APPARATUS

BACKGROUND OF THE INVENTION

1. Field of the Invention

The field of invention relates to toy and teaching apparatus, and more particularly pertains to a new and improved mathematical and spatial toy apparatus wherein the same is arranged to indicate a prior art improvement utilizing individual block members that are assembled on a one-at-a-time basis to provide for a cumulative teaching of toy block assemblage.

2. Description of the Prior Art

Prior art visual mathematical teaching is indicated in the U.S. Pat. Nos. 4,915,634; 4,883,277; 4,884,973; and 3,690,018 as examples of prior art teaching structure.

SUMMARY OF THE INVENTION

In view of the foregoing disadvantages inherent in the known types of mathematical toy apparatus now present in the prior art, the present invention provides a mathematical and spatial toy apparatus wherein the same is directed to the teaching of children and the like the inter-relationship in the assemblage of various incremental block members. As such, the general purpose of the present invention, which will be described subsequently in greater detail, is to provide a new and improved mathematical and spatial toy apparatus which has all the advantages of the prior art mathematical toy teaching apparatus and none of the disadvantages.

To attain this, the present invention provides a mathematical and spatial toy apparatus arranged to include a grooved rack board arranged to receive individual block components to teach children the mathematical cumulative effect of such boards to provide rudimentary teaching in mathematical and spatial relationships.

My invention resides not in any one of these features per se, but rather in the particular combination of al of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mathematical and spatial toy apparatus which has all the advantages of the prior art mathematical teaching toy apparatus and none of the disadvantages.

It is another object of the present invention to provide a new and improved mathematical and spatial toy apparatus which may be easily and efficiently manufactures and marketed.

It is a further object of the present invention to provide a new and improved mathematical and spatial toy apparatus which is of a durable and reliable construction.

An even further object of the present invention is to provide a new and improved mathematical and spatial toy apparatus which is susceptible of a low cost of manufacture with regard to both materials and labor, and which accordingly is then susceptible of low prices of sale to the consuming public, thereby making such mathematical and spatial toy apparatus economically available to the buying public.

Still yet another object of the present invention is to provide a new and improved mathematical and spatial toy apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
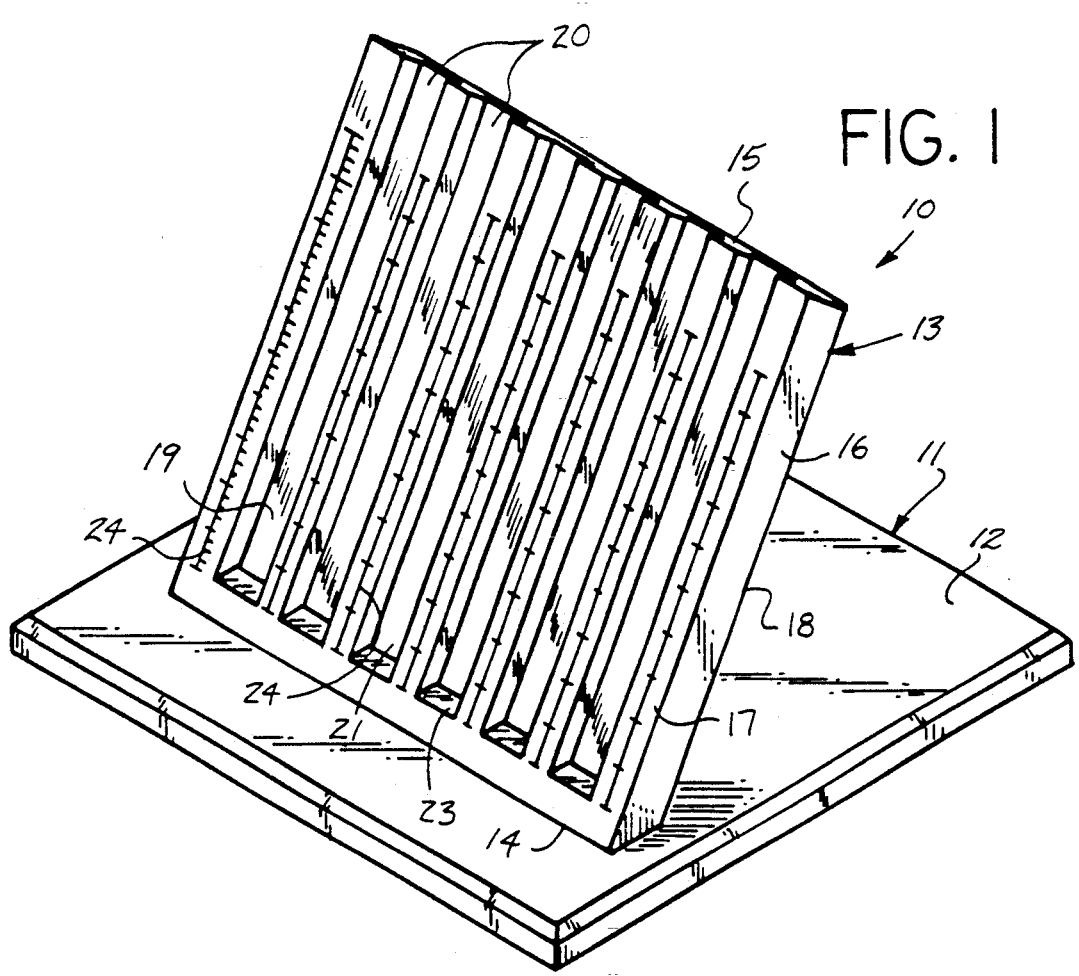
FIG. 1 is an isometric illustration of the invention.
Figure 2:
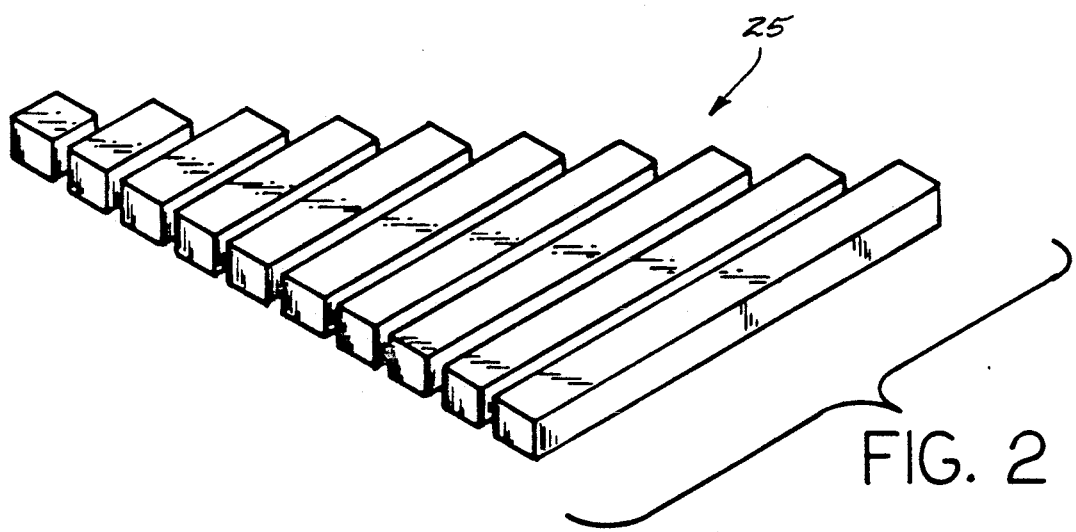
FIG. 2 is an isometric illustration of the block members employed by the invention for insertion into the rack housing, as indicated in FIG. 1.

With reference now to the drawings, and in particular to FIGS. 1 to 8 thereof, a new and improved mathematical and spatial apparatus embodying the principles and concepts of the present invention and generally designated by the reference numerals 10 and 10a will be described.

Figure 3:
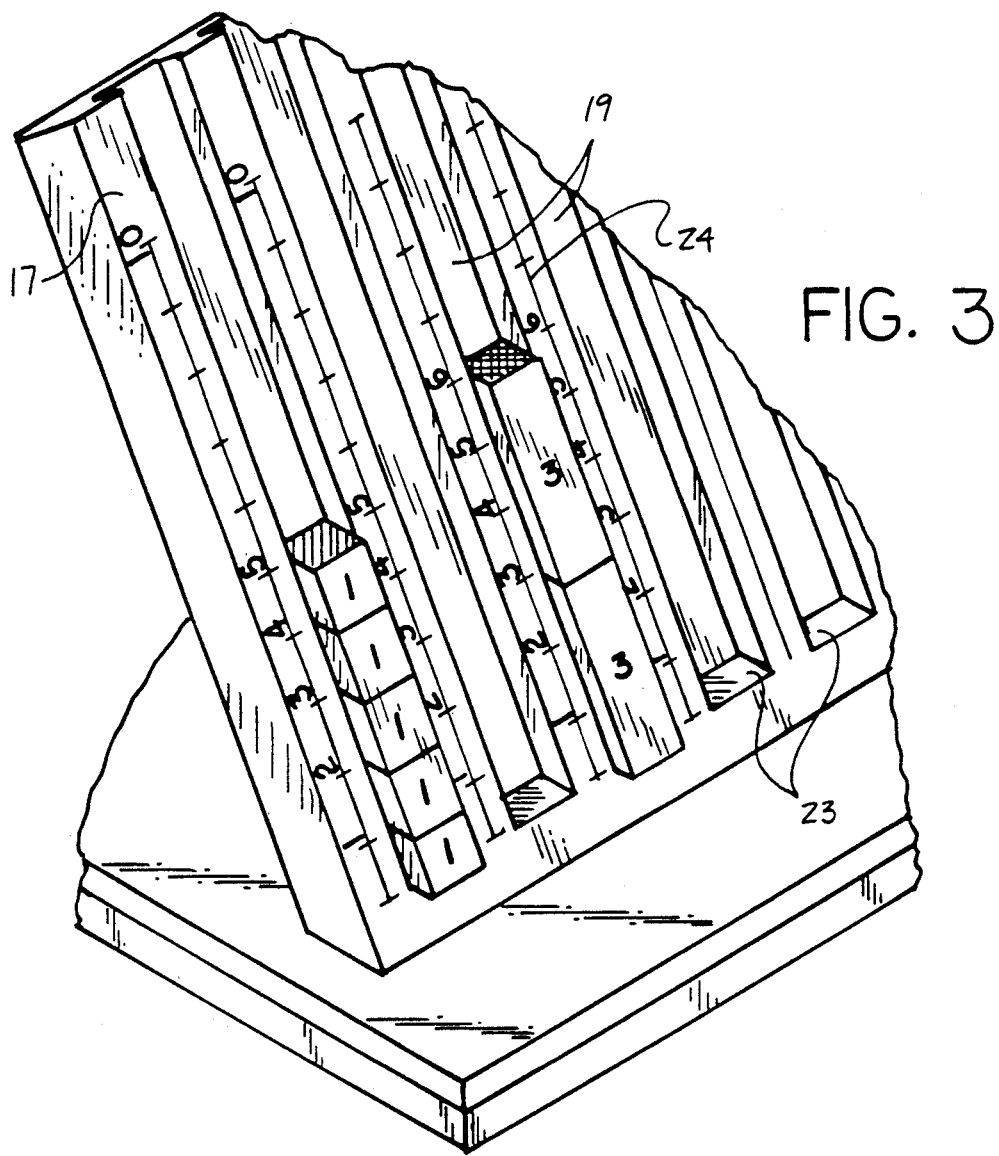
FIG. 3 is an enlarged isometric illustration of the block members positioned within the rack housing.
Figure 4:
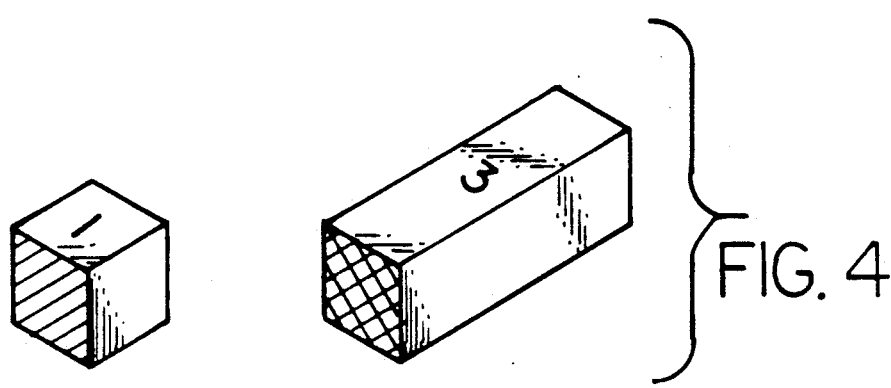
FIG. 4 is an isometric illustration of a plurality of the bock members of contrasting colorations.

More specifically, the mathematical and spatial toy apparatus 10 of the instant invention essentially comprises a base housing 11 having a base housing top wall 12 arranged to mount a rack housing 13 thereon. The rack housing includes a rack housing bottom wall 14 spaced from a rack housing top wall 15, with rack housing side walls 16. A rack housing front wall 17 spaced from a rack housing rear wall 18 is arranged such that the wall 17 includes a plurality of parallel grooves 19 directed into the rack housing top wall 15 parallel and between the rack housing side walls 16. Each of the grooves 19 includes a groove entrance 20 directed through the rack housing top wall 15 terminating in a groove end wall 23 positioned in adjacency and spaced relative to the rack housing bottom wall 14, with a groove floor 21 extending between the groove entrance 20 and the end wall 23. An individual indicia line 24 is positioned upon the top wall 17 in adjacency to each of the parallel grooves 19 coextensive with each of the parallel grooves. Each of the indicia lines 24 is demarcated into predetermined increments. A plurality of block members 25 of varying lengths, with the lengths each a multiple of said predetermined increments are arranged for complementary reception into an associated groove 19. In this manner, stacking of the block members, in a manner as indicated in FIG. 3 for example, permits children and the like to understand the relationships of addition and subtraction. Further, the blocks may be of contrasting colorations to assist in distinction and demarcation of the individual block members relative to one another.

Figure 5:
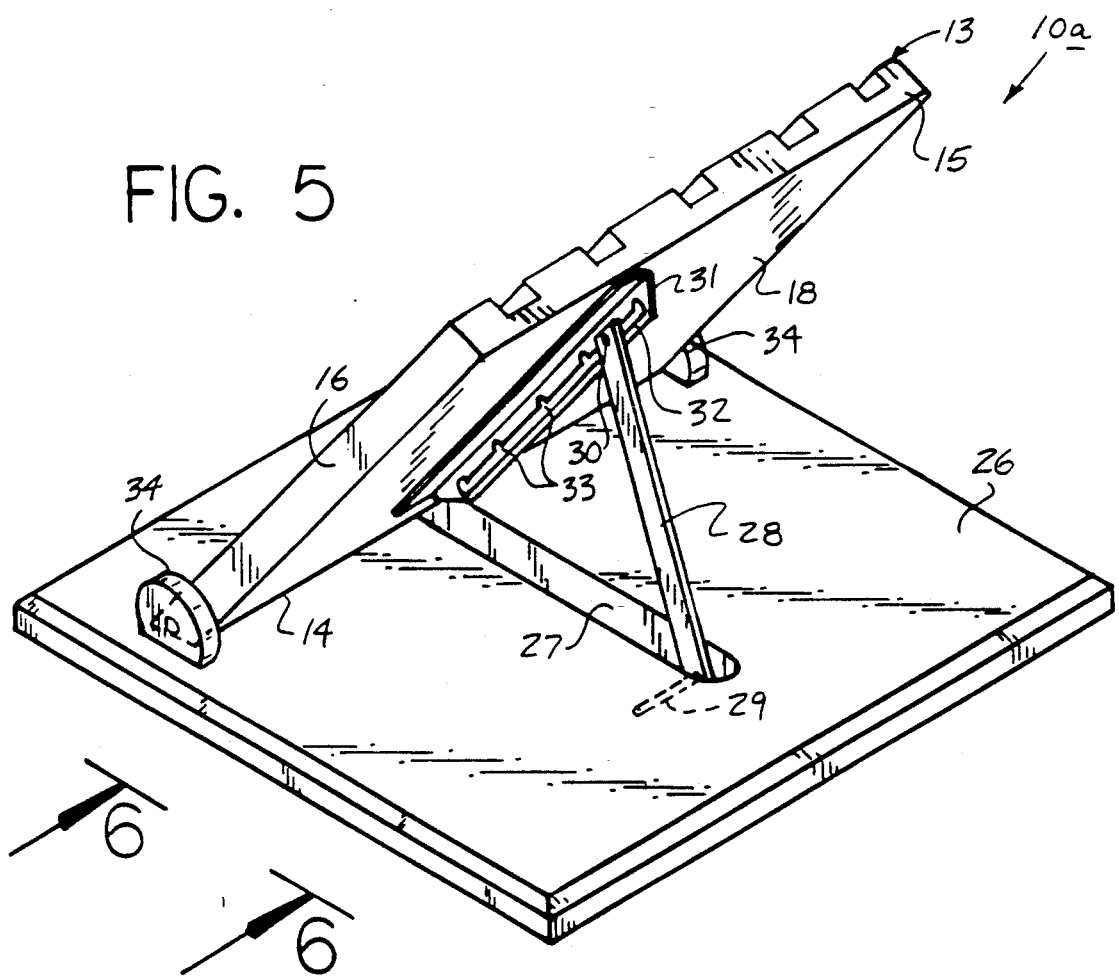
FIG. 5 is an isometric rear view of a modified construction of the invention.
Figure 6:
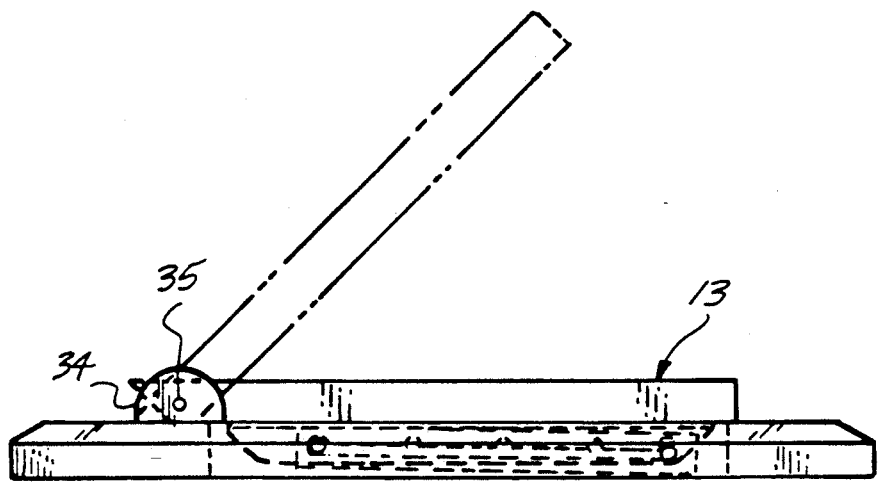
FIG. 6 is an orthographic view, taken along the lines 6—6 of FIG. 5 in the direction indicated by the arrows, with the rack housing pivotally mounted in adjacency to the base housing for storage.

The FIGS. 5 and 6 indicates the use of the rack housing 13 pivotally mounted relative to the base housing, wherein a modified base housing top wall 26 includes a top wall slot 27 directed therethrough, with a support leg 28 extending from the slot about a first axle 29 at a first end of the support leg 28, wherein the second axle 30 is mounted to the second end of the support leg 28, with the second axle 30 received within a rack housing latch flange 31 that includes a latch flange slot 32 receiving the second axle 30. Spaced recesses 33 intersect the latch flange slot 32 to selectively receive the second axle 30 therewithin to pivotally orient the rack housing 13 in a desired angular orientation, wherein rack housing support flanges 34 fixedly mounted to the housing top wall 26 on opposed sides of the rack housing side wall 16 in adjacency to the bottom wall 14 each include a support flange axle 35, such that the support flange 35 of each of the support flanges 34 are coaxially aligned and orthogonally oriented relative to the top wall slot 27 and the support leg 28 to permit reception of the latch flange 30 within the latch flange slot 32 when the second axle 30 is slidably directed towards the rack housing bottom wall 14 along the latch flange slot 32, in a manner as indicated in FIG. 6.

Figure 7:
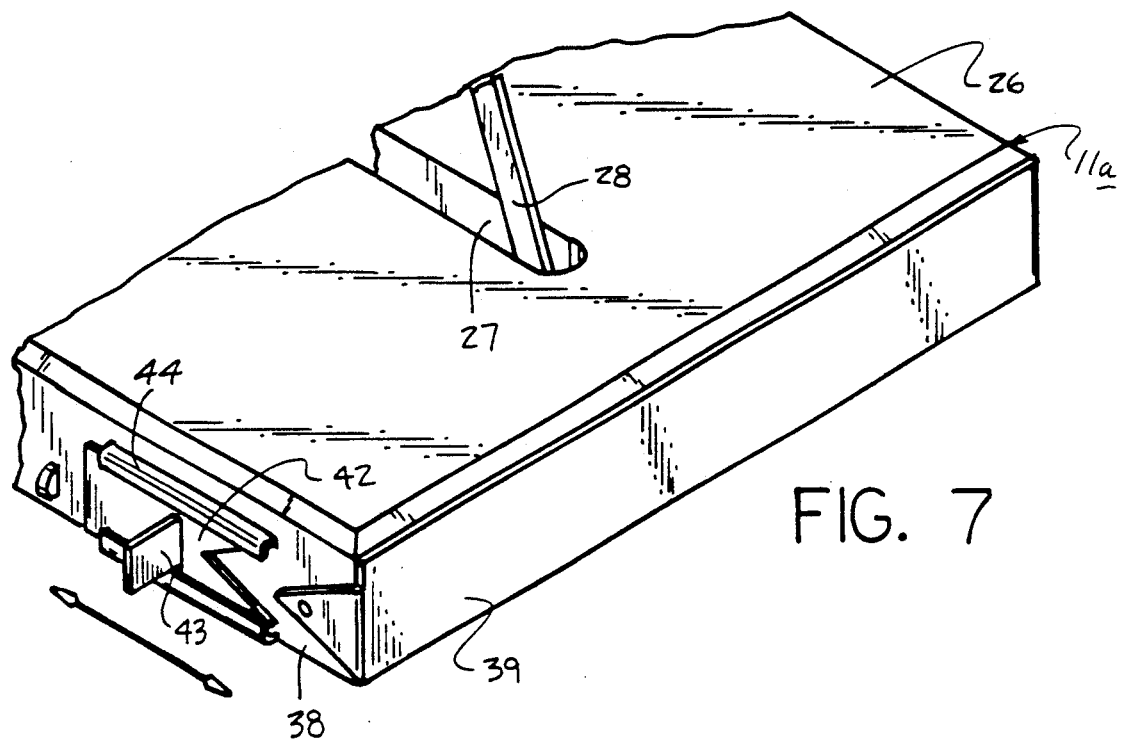
FIG. 7 is an enlarged isometric illustration of a modified base housing having a latch mechanism for a cover plate.
Figure 8:
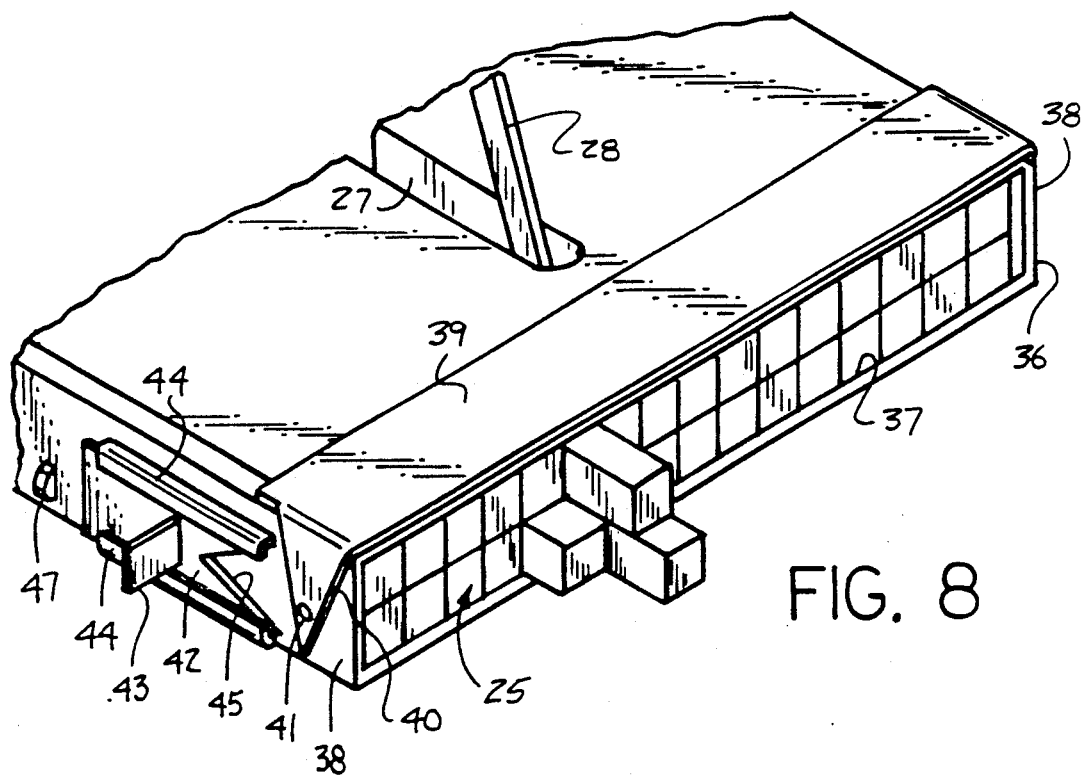
FIG. 8 is an isometric illustration of the cover plate arranged in a displaced second position for access to block members positioned for storage within the base housing.

The FIGS. 7 and 8 indicate that the base housing includes a base housing rear wall 36 in surrounding relationship relative to the base housing cavity 37, wherein storage of the individual block members 25 is provided between the base housing side walls 38. A cover plate 39 including side flanges 40 that are arranged parallel relative to one another are such that each of the side flanges 40 are pivotally mounted to an associated base housing side wall 38 about a side flange axle 41. Further it should be noted that each of the cover plate side flanges 40 is of a predetermined configuration. A slide latch 42 is provided slidably mounted along at least one of the side walls 38, having a latch handle 43 permitting ease of manipulation of the slide latch within spaced track flanges 44. A recess 45 is directed into a forwardmost end of the slide latch 42, with the recess 45 of a predetermined configuration to complementarily receive the side flanges 40 when the cover plate 39 is in a first position, as indicated in FIG. 7, extending over the cavity 37, and wherein the slide latch 42 is displaced relative to the side flanges 40 when the cover plate 39 is in a second position extending over the top wall 26, as indicated in FIG. 8. An abutment lug 47 is positioned between the slide latch and a base housing front wall to limit displacement of the slide latch within the track flanges 44.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A mathematical and spatial toy apparatus, comprising,
   a base housing, the base housing including a base housing top wall and spaced base housing side walls, and a base housing rear wall spaced from a base housing front wall, with a rack housing mounted to the base housing top wall, the rack housing including a rack housing bottom wall spaced from a rack housing top wall, spaced rack housing side walls, a rack housing front wall, and a rack housing rear wall, with a plurality of parallel grooves arranged coextensively relative to one another orthogonally oriented to the rack housing top wall and extending through the rack housing top wall, wherein the rack housing top wall includes a groove entrance relative to each of the parallel grooves, each of the parallel grooves includes a groove floor coextensive with each of the parallel grooves, and a grove end wall positioned in adjacency to and spaced from the rack housing bottom wall, and each of the grooves includes an individual indicia line arranged parallel to and coextensive relative to each of said parallel grooves, wherein each indicia line is demarcated at predetermined increments, and a plurality of block members of varying lengths, wherein the varying lengths are multiples of said predetermined increments permitting complementary positioning of at lest one of said block members within one of said grooves, and the base holding top wall includes at op wall slot, and a support leg, the support leg having a first end having a first axle positioned within said top wall slot, the support leg having a support leg second end, and a second axle through the support leg second end, wherein the first axle is parallel to the second axle, and a latch flange fixedly and orthogonally mounted to the rack housing rear wall, with the latch flange having a latch flange slot receiving the second axle orthogonally therethrough, and the latch flange further including a plurality of intersecting spaced recesses, wherein each of said spaced recesses is arranged to receive the second axle selectively, and a plurality of rack housing support flanges fixedly and orthogonally mounted to the base housing top wall, wherein the support flanges each include a support flange axle, and each support flange axle is orthogonally oriented relative to the latch flange slot permitting pivoting of the rack housing about each support flange axle.

2. An apparatus as set forth in claim 1 wherein the base housing rear wall includes a cavity directed into the base housing through the rear wall, and a cover plate, the cover plate including cover plate side flanges, and each of the side flanges includes a side flange axle, and each side flange axle is directed into one of the base housing side walls permitting pivoting of the cover plate over the base housing rear wall from a first position extending coextensively over the rear wall to a second position displaced from the base housing rear wall, and wherein each of the side flanges is of a predetermined configuration, and a slide latch slidably mounted to one of said base housing side walls, wherein the slide latch includes a recess, the recess configured of said predetermined configuration arranged to complementarily receive one of said side flanges when the cover plate is in the first position.

* * * * *